Oct. 10, 1933.                P. POLLOCK ET AL                1,929,607
                              LADLE STRUCTURE
                          Filed March 7, 1931            6 Sheets-Sheet 1

INVENTORS

Oct. 10, 1933.  P. POLLOCK ET AL  1,929,607
LADLE STRUCTURE
Filed March 7, 1931    6 Sheets-Sheet 2
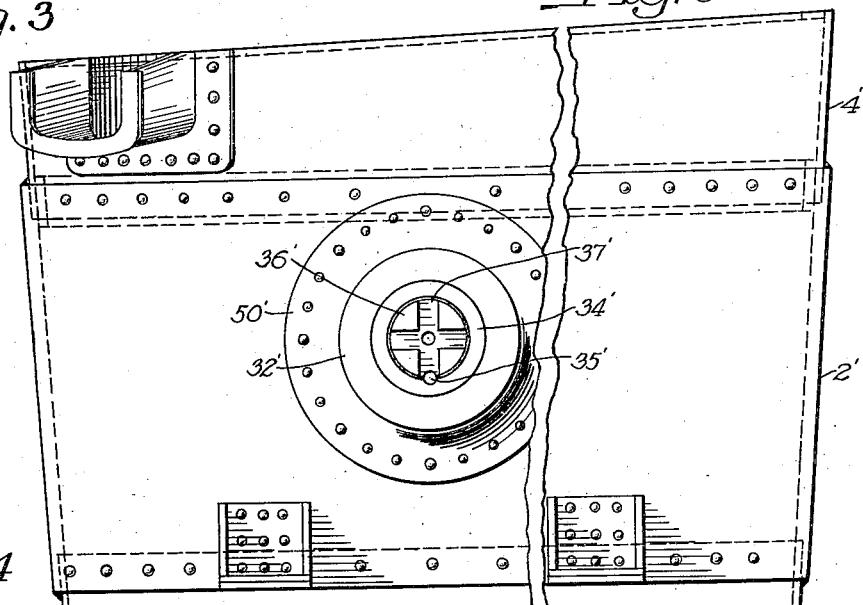
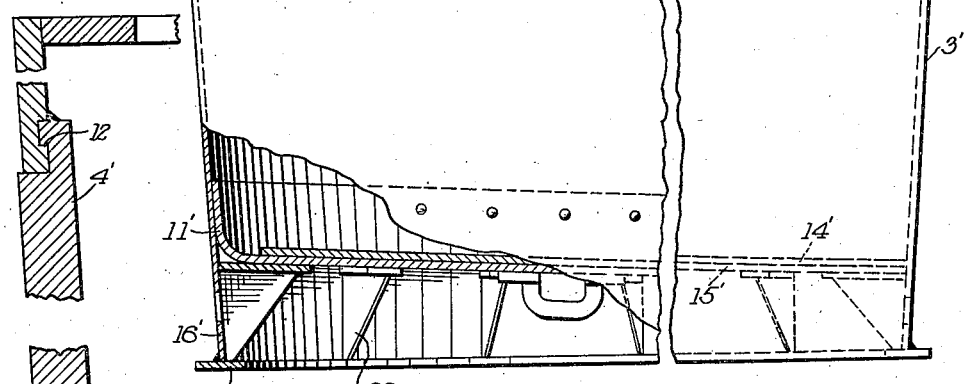
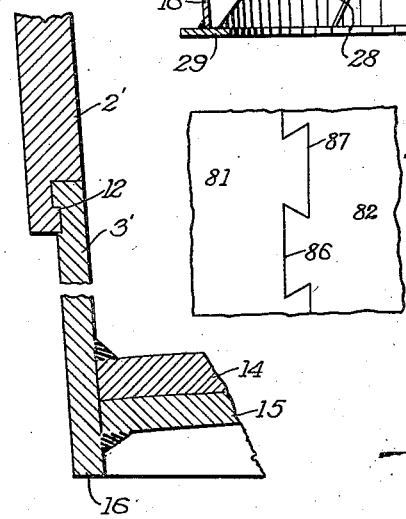
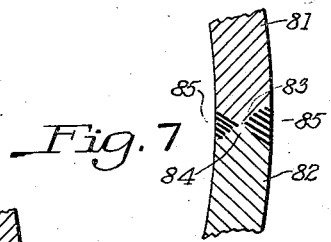
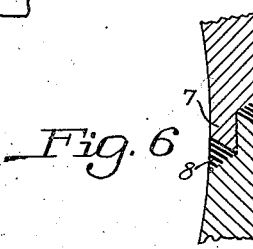
INVENTORS
Porter Pollock,
Christian A. Wells,
by their attys.

Oct. 10, 1933.    P. POLLOCK ET AL    1,929,607
LADLE STRUCTURE
Filed March 7, 1931    6 Sheets-Sheet 3
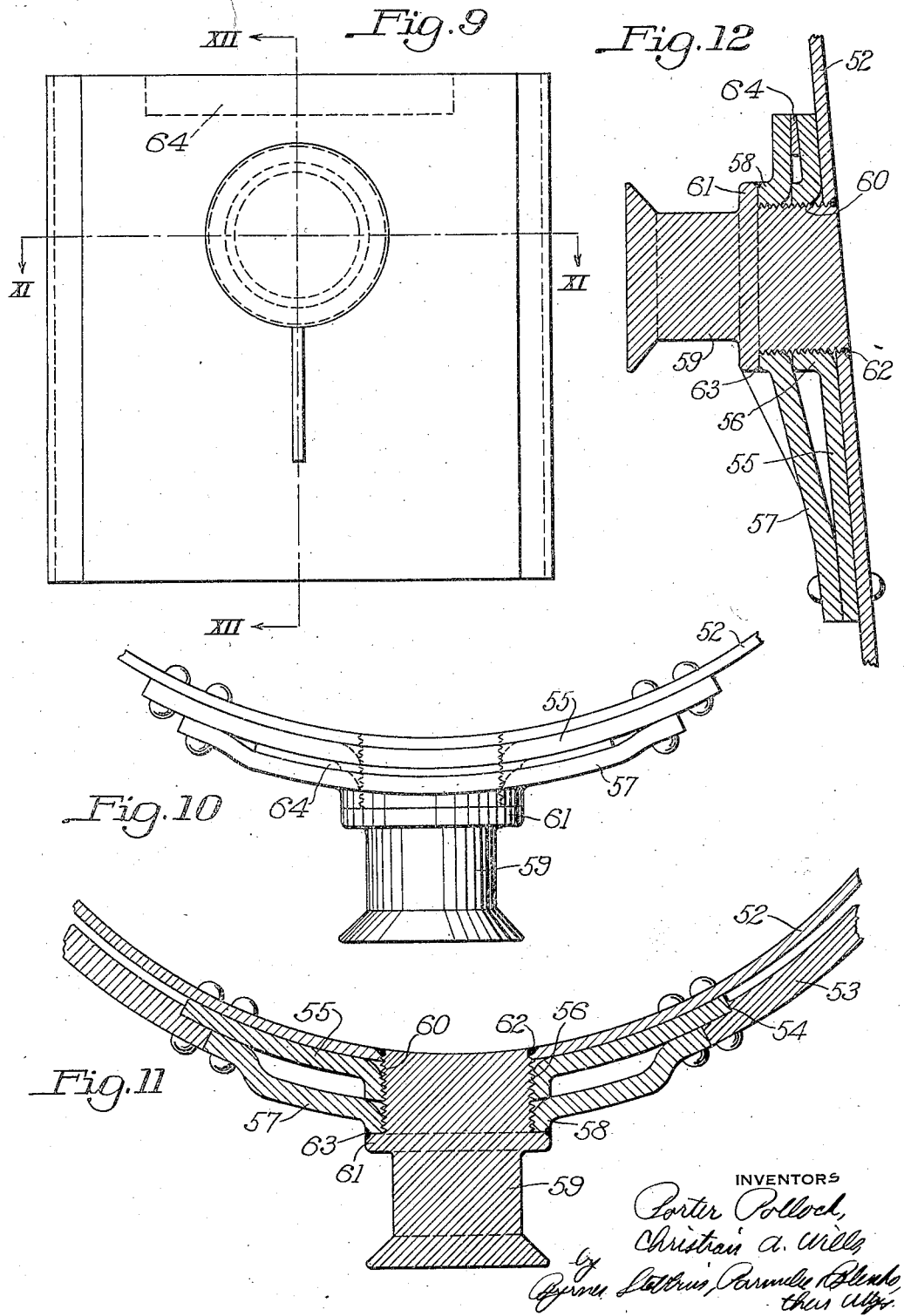

Oct. 10, 1933.  P. POLLOCK ET AL  1,929,607
LADLE STRUCTURE
Filed March 7, 1931    6 Sheets-Sheet 4
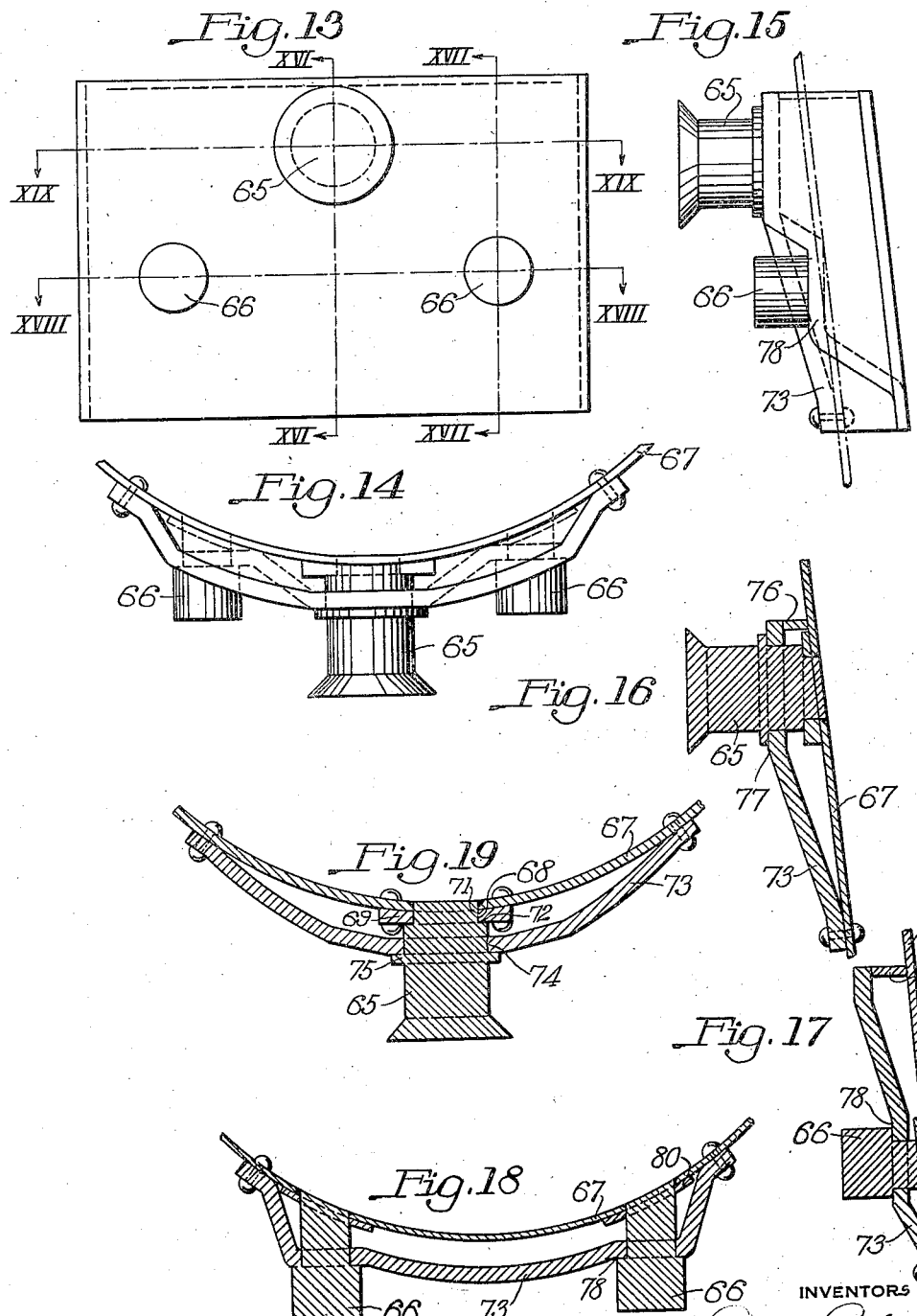

Oct. 10, 1933.    P. POLLOCK ET AL    1,929,607
LADLE STRUCTURE
Filed March 7, 1931    6 Sheets-Sheet 5
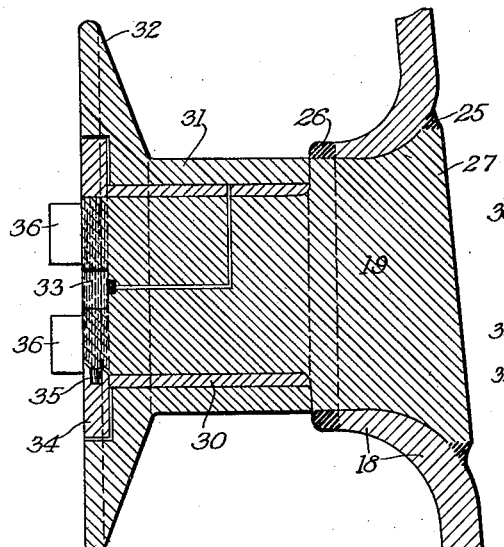
Fig. 20
Fig. 22
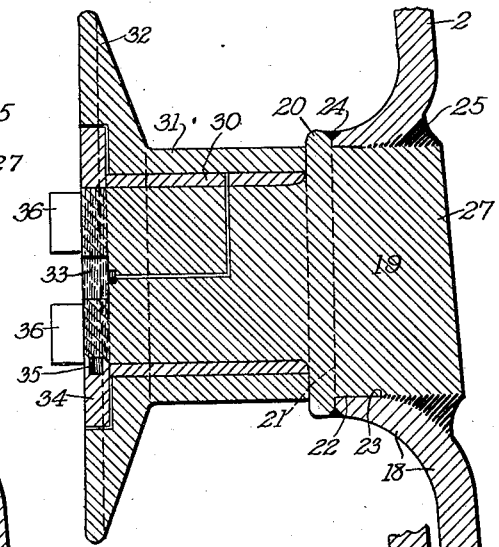
Fig. 21
Fig. 23
INVENTORS
Porter Pollock,
Christian A. Wille, Oct. 10, 1933.  P. POLLOCK ET AL  1,929,607
LADLE STRUCTURE
Filed March 7, 1931   6 Sheets-Sheet 6

INVENTORS
Porter Pollock,
Christian C. Wills,

Patented Oct. 10, 1933

1,929,607

UNITED STATES PATENT OFFICE 1,929,607

LADLE STRUCTURE

Porter Pollock and Christian A. Wills, Youngstown, Ohio, assignors to The William B. Pollock Company, Youngstown, Ohio, a corporation of Ohio Application March 7, 1931. Serial No. 520,867

1 Claim. (Cl. 22—81)

REISSUED

The present invention relates broadly to the art of material handling, and more particularly to improved container structures of the character adapted for the handling of molten metal. Such containers are ordinarily referred to as ladles, and the term ladle is hereinafter used generically as a word of definition including different containers for the contemplated purpose, irrespective of the particular shape or construction thereof.

Ladles as ordinarily used in steel mills are usually of the so-called open hearth type, or of the type adapted for mounting on a suitable car structure whereby they may be transported from place to place. Ladles of the open hearth type are usually of such construction that they may effect a bottom pour, while ladles of the type utilized with cars may be either of the short pour or long pour type. The present invention is not limited with respect to the particular use to which the ladle is to be put. Such ladles all have certain features in common. This is true for example, with respect to the trunnions provided for cooperation either with the crane hooks in the case of an open hearth ladle, or with the trunnion supports in a case of a ladle of the car type.

It is one of the objects of the present invention to provide an improved trunnion structure and mounting for ladles, of such nature as to facilitate the manufacture of the ladles, increase the strength thereof, and materially decrease the weight. With a standard 125 ton ladle, for example, there is usually involved a weight in the neighborhood of 60,000 to 70,000 lbs. In accordance with the present invention it is possible to decrease the dead weight of such a ladle from 20,000 to 30,000 lbs. This decrease in weight not only facilitates the handling of the metal, but makes it possible to handle a greater metal quantity with a crane of given capacity.

It is customary to provide ladles with so-called spacers, which spacers are usually of cast metal adapted to surround the central portion of the ladle structure for the purpose of reinforcing the same and providing sufficient body for the formation of trunnions, the trunnions not infrequently being cast directly and integrally with the so-called spacers. In accordance with one embodiment of the present invention the provision of spacers is entirely eliminated, and an improved ladle structure afforded of such characteristics as to give the necessary strength, facilitate the manufacture of the ladle shell itself, and enable the mounting of trunnions thereon.

The invention in its broader aspects is susceptible to incorporation in a wide variety of different ways, and the accompanying drawings are illustrative only of representative ladle and trunnion structures. In the drawings:

Figure 3 is a view similar to Figure 1 of another modification of the invention;

Figure 4 is an enlarged vertical sectional view of a ladle side;

Figure 5 is a view in side elevation of a portion of a shell showing a dovetail connection between the parts thereof;

Figure 6 is a detail horizontal sectional view on an enlarged scale of a modified joint between the parts of the shell;

Figure 7 is a view similar to Figure 6 illustrating a modified embodiment of the welded joint;

Figure 8 is a view in side elevation of a portion of another modification of the ladle shell;

Figure 9 is a partial elevational view, similar to Figure 1, illustrating still another embodiment of the invention;

Figure 10 is a top plan view of the construction illustrated in Figure 9;

Figure 11 is a detail sectional view along the line XI—XI of Figure 9;

Figure 12 is a view similar to Figure 11, but taken along the line XII—XII of Figure 9;

Figure 13 is a view similar to Figure 9, illustrating a further embodiment of the invention;

Figure 14 is a top plan view of the construction illustrated in Figure 13;

Figure 15 is a side elevational view of the structure illustrated in Figures 13 and 14;

Figure 16 is a sectional view on the line XVI—XVI of Figure 13;

Figure 17 is a detail sectional view on the line XVII—XVII of Figure 13;

Figure 18 is a detail sectional view on the line XVIII—XVIII of Figure 13;

Figure 19 is a detail sectional view on the line XIX—XIX of Figure 13;

Figure 20 is an enlarged vertical sectional view illustrating in detail the trunnion shown in Figures 1 and 2;

Figure 24:
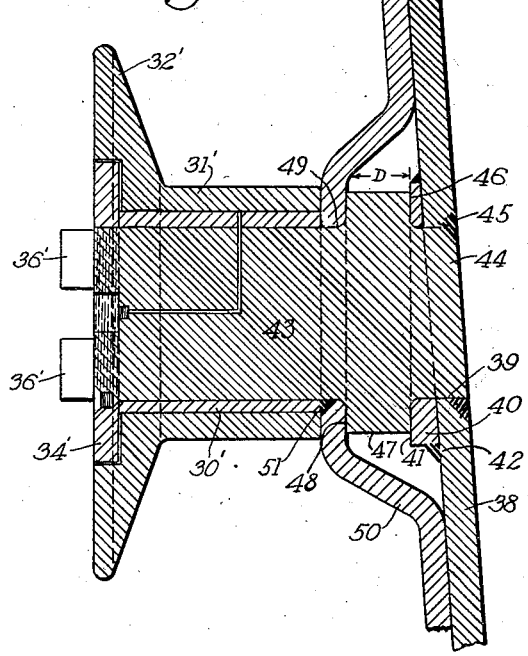
Figure 25:
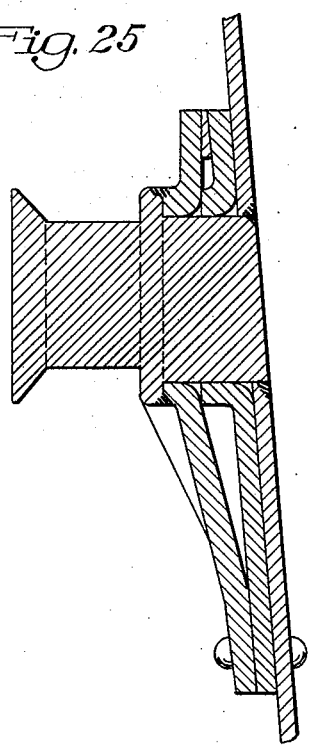

Figures 21 to 24, inclusive, are views similar to Figure 20 of modified trunnions, and Figure 25 is a view similar to Figure 12 of a modification.

Referring more particularly to Figures 1 to 7, both inclusive, of the drawings, there is illustrated a ladle shell comprising an intermediate section 2 with which cooperates a bottom section 3 and a top section 4. As is clearly apparent from Figures 1 and 2, the intermediate section 2 is of materially heavier construction, with respect to thickness, than is either the bottom section 3 or the top section 4. To facilitate the attachment of the top and bottom sections, the intermediate section may be mortised at its opposite edges to provide recesses 5 within which the adjacent edges of the top and bottom sections may be secured in any desired manner as, for example, by welding. If desired, the joint between the intermediate section 2 and the top section 4, may be reinforced by a band 6 welded in position and in turn having its own ends welded together.

It is to be observed that the sections 3 and 4, which represent substantially annular bands of metal, may be easily formed up from sheets or plates by a simple forming operation, and then welding the ends together. While each of the sections might be formed of a single piece of material, we preferably utilize one piece of material for each half of the section, and secure the adjoining ends thereof together in the manner illustrated in Figure 6. In accordance with this construction there is a mechanical interlocking of the sheets afforded by the overlapping of the reduced end portions 7, and a double line of weld 8 and 9. While this form of construction is adapted to each of the sections, it may be applied only with respect to the intermediate section 2, and by merely welding the ends of the lighter sections 3 and 4 together in straight abutting relationship.

The upper section 4 is illustrated as having welded thereto an inwardly projecting top band 10 adapted to extend over, partially enclose and protect the refractory lining (not shown) subsequently applied to the interior of the ladle shell.

The bottom of the ladle may be formed as desired. In the drawings we have shown the bottom as comprising a head 11 shaped to cooperate with the bottom section 3 and welded in position therein in overlapping relationship.

The ladle shell just described, which is suitable for use as an open hearth ladle, differs from ordinary ladles in several respects. In the first place, the construction of a ladle shell from separate sections, where the central section is of such thickness as to obviate the requirement for trunnion spacers and is of itself of sufficient strength to carry the trunnions and prevent distortion of the ladle, is novel. In the second place, ladle trunnions are ordinarily constructed of castings, while the present ladle and its trunnions are formed entirely of sheets and/or forging plates suitably secured together as by welding. This enables the entire ladle structure to be formed in a steel plate fabricating shop from readily available material at a minimum cost and of a minimum weight, and without the possibility of defects such as are frequently present in large castings. In the third place, there is provided a ladle shell in which the renewal of any part of the ladle in the event of injury thereto is facilitated, thereby providing a materially lighter ladle structure having the same capacity as ladles for the same purpose, heretofore provided, and of potentially greater life and strength.

Figure 1:
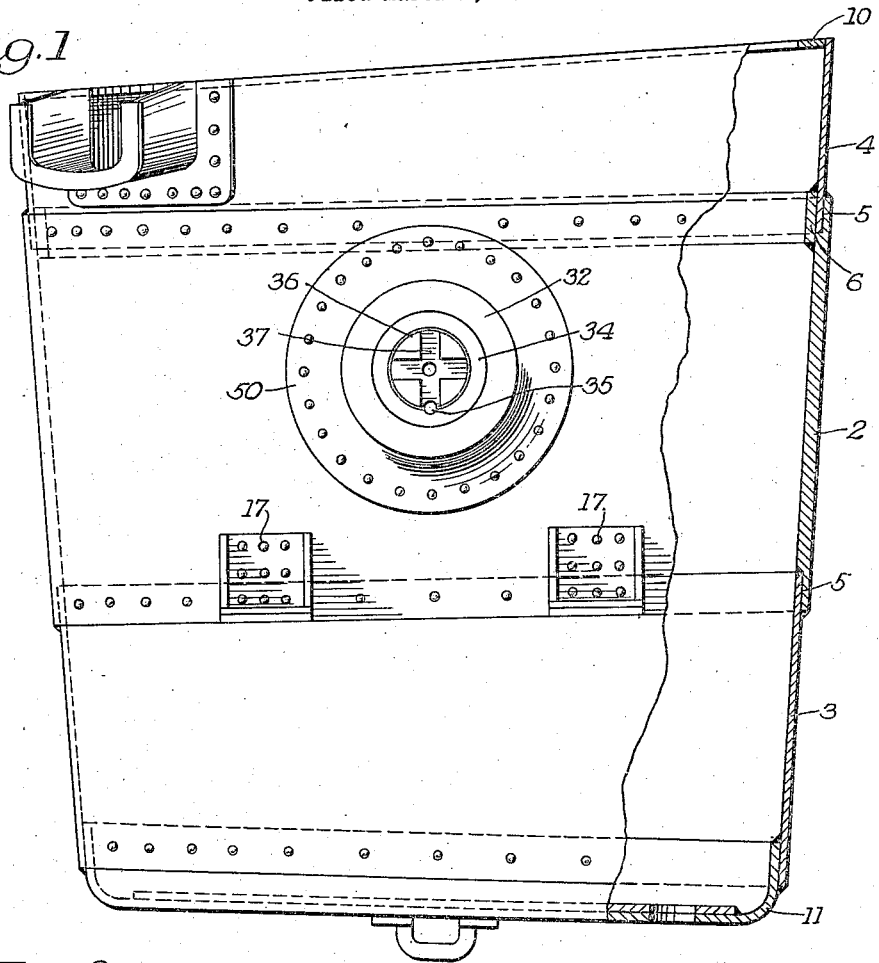
Figure 1 is a view in side elevation, partly broken away, of one form of ladle shell embodying the present invention.
Figure 2:
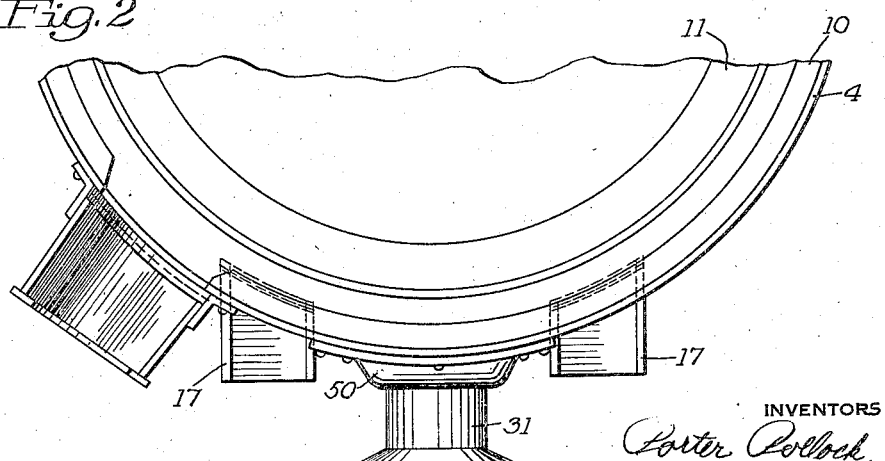
Figure 2 is a top plan view of a portion of the ladle shown in Figure 1.

Instead of merely overlapping the sections as illustrated in Figures 1 and 2, the intermediate section 2' may be constructed as illustrated in Figure 4, and the sections 3' and 4' similarly constructed to provide a mechanically interlocked engagement 12 more effectively precluding separation of the sections and insuring a uniform tensile strength throughout the entire circumference of the ladle shell. In these figures also we have illustrated the bottom as comprising superimposed plates 14 and 15 upwardly bowed and welded in position entirely within the bottom section 3' so as to be protected against injury by the downwardly projecting edge or lip 16 of the bottom section. This enables the ladle to be deposited at will upon any surface without fear of injury to the bottom.

With a ladle of the structure illustrated more particularly in Figures 1 and 2, on the contrary, it is necessary to provide pads or seats 17 at suitable points around the periphery and adapted to support the ladle within a suitable stand. While it is entirely feasible to reinforce a ladle shell of the structure described by passing bands therearound, and extending circumferentially thereof and similar, for example, to an ordinary barrel hoop, such bands are not essential, and constitute no important part of the present invention.

Figure 3 shows a further modification of the bottom construction. Here the head 11' is secured to the section 3' in such manner that a portion 16' extends below the head 11'. The head 11' is reinforced by braces 28 that are secured to the inside of the portion 16' and the bottom of the head by welding or other suitable means. A flat base 29 is secured to the lower end of the portion 16' for protecting it and for supporting the ladle more efficiently than the narrow end of the portion 16'.

Figure 8 shows a similar bottom construction applied to the modification illustrated by Figure 4.

Referring more particularly to Figures 2, 21 and 23 of the drawings, the main body section 2 of the ladle shell is illustrated as having outwardly pressed portions 18 formed in the sides thereof and adapted to constitute trunnion seats. In accordance with the usual practice, these seats will be located on diametrically opposite sides of the ladle. Cooperating with each of the seats is a trunnion 19 having an intermediate flange 20 adapted to abut against the seat 18 in a plane 21 parallel to the axis of the ladle. Adjacent the flange 20 is a cylindrical portion 22 adapted to cooperate with a machined cylindrical surface 23 on the inside of the seat 18. The trunnion 19 having been inserted in position, may be welded to the seat as indicated at 24.

For extending the effectiveness of the seat 18 and further interlocking the trunnion in position within the seat to prevent the same from being pulled outwardly in case the weld 24 should prove defective, we weld the trunnion 19 to the inside of the seat 18 by a ring of welding material 25. This affords a firm mounting for the trunnion in the ladle shell, there being not only an extended bearing which is effective for maintaining the axis of the trunnion substantially normal to the axis of the ladle shell, but which is also effective due to the mechanical and welded relationship of the parts, for preventing axial movement of the trunnions outwardly from the ladle shell.

Outside of the flange 20, each trunnion is shaped to receive a bushing 30. Mounted exteriorly of the bushing, and rotatable thereon is a sleeve 31 adapted to receive a ladle hook, the sleeve being formed with an enlarged outer end 32 to prevent the ladle hook from slipping outwardly from supporting relationship with the sleeve. For retaining the sleeve and bushing in position, the outer end of the trunnion may be threaded as indicated at 33 to receive a threaded collar 34. The collar having been applied, it may be locked in position by a suitable key or keys 35. As is customary in the art, the trunnion may also be formed on its outer end with lugs 36 providing a vertically extending way 37 adapted to cooperate with a suitable locking bar on the ladle hook to prevent undesirable rotation between the ladle and the hook.

Figure 20 illustrates a modification of the trunnion construction of Figure 21. In Figure 20, the flange 20 is dispensed with by welding the trunnion directly to the seat 18 by a ring of welding material 26. The base 27 of the trunnion is shaped to correspond to the shape of the seat 18 and is inserted from the inside of the ladle. This construction is very strong and serviceable.

Figure 22 illustrates a modification of the trunnion construction shown in Figure 20. In this modification the seat 18 is reinforced by a collar or trunnion plate 50 which fits over the periphery of the seat 18 and is welded, riveted or otherwise secured to the section 2.

Figure 23 shows a trunnion construction embodying the desirable features of the construction shown in Figure 21, with the added reinforcing collar plate 50 which is mounted as described above.

In Figure 24 of the drawings there is illustrated a slightly modified embodiment of the invention with respect to the mounting of the trunnion. As herein shown, the intermediate body portion 38 of the shell, corresponding to the portions 2 and 2' before described, is suitably machined to provide diametrically opposed openings 39. Adjacent each opening 39, only one of which is illustrated in Figure 24, there is welded exteriorly of the shell a pad or seat 40 shaped on one side to conform to the contour of the shell both with respect to taper or inclination, and curvature, and on the opposite side to provide a substantially flat vertically extending surface 41.

This pad or seat may be welded to the shell around its entire periphery as indicated at 42 so as to constitute in effect an integral part thereof. This assembly operation having been performed, a trunnion 43 is inserted in position in the opening 39. The trunnion has a reduced inner end 44 substantially conforming to the contour and dimensions of the opening, and adapted to be welded in position by a circumferentially extending weld 45 substantially flush with the inner surface of the shell. In this position, a shoulder 46 on the trunnion abuts against the seat 41, the shoulder 46 being formed by a projecting flange 47. This flange also provides an outwardly facing shoulder 48. This outwardly facing shoulder is adapted to cooperate with an opening 49 in an auxiliary seat 50.

The auxiliary seat is formed of a suitable plate pressed substantially to shape, the contour as formed, however, being such that the seat provides a cavity having a depth less than the corresponding distance D. Due to this fact, the auxiliary seat when forced into the position illustrated in Figure 24 will first come into engagement with the shoulder 48 and will thereafter tend to force the trunnion into position, it being assumed that the weld 45 has not been formed prior to this time. The auxiliary seat having been forced to position may be secured in any desired manner to the ladle shell by rivets, bolts, welding or the like, or a combination of these fastening means being employed. The remainder of the trunnion structure is generally similar to that before described and certain of the parts are designated by the same reference characters as those appearing in Figure 3, but with a prime affixed thereto.

To those skilled in the art it will be apparent that the trunnion structure just described, similarly to the trunnion structure first referred to, also provides an elongated bearing seat, the seat in the latter instance, however, comprising two distinct seats axially spaced along the trunnion axis. It will further be understood that the auxiliary seat may be so shaped as to facilitate the welding thereof directly to the trunnion as indicated at 51.

In Figures 9 to 12, both inclusive, there is illustrated a slightly modified form of the invention adapted for use with ladles of standard construction. Such a ladle comprises a shell 52 around which extends a trunnion spacer bar, plate or slab 53. This spacer bar, plate or slab, in accordance with the present invention, may comprise a casting, but preferably comprises a bar, plate or slab bent to shape and having its ends adjacent the trunnions recessed as indicated at 54. Secured directly to the ladle shell is an inner trunnion plate 55 having a trunnion receiving opening surrounded by an outwardly extending flange and seat 56. Exteriorly of the inner trunnion plate, is an outer trunnion plate 57 of generally similar construction, both of the trunnion plates being formed of pressed sheet or plate material of suitable thickness. The flange 58 on the outer trunnion plate extends in alinement with and constitutes a continuation of the flange 56, thereby providing an elongated bearing for a trunnion 59. This trunnion is illustrated as having a reduced inner end 60 threaded throughout its length and terminating in a flange 61.

The trunnion may also be made without threads and with the opening bored to fit it as shown in Figure 25.

It will be understood that the trunnion seats in the plates 55 and 57 are internally threaded to receive the trunnion, whereby the parts may be assembled readily in the manner illustrated in the drawings, the trunnion being threaded inwardly to the extent necessary to bring the flange 61 into engagement with the seat flange 58 on the outer trunnion plate. In this position the inner end of the trunnion may be welded to a shell as indicated at 62, the flanges 61 and 58 may be similarly welded as indicated at 63.

The construction of these figures also provides an elongated trunnion bearing, the bearing in this case, however, being formed by separate plates secured in superimposed relationship to each other and to the trunnion spacer bar as illustrated more particularly in Figure 11 of the drawings. Intermediate the trunnion plates at their upper portions there may be provided a filler bar 64 effective for reinforcing the parts and more effectively transmitting the trunnion load directly to the ladle shell.

While we have illustrated in Figures 9 to 12 a simple form of trunnion without a bushing and sleeve as heretofore described, it will be apparent that such a bushing and sleeve may be utilized if desired, the particular construction in this respect being a refinement not limited by the particular manner of securing the trunnion in position on the ladle shell.

In Figures 13 to 19 of the drawings there is illustrated still another embodiment of the invention and adaptable either to the mounting of single trunnions or to the mounting of a plurality of trunnions as may be desired. It is to be understood that open hearth ladles usually have provided a single trunnion on each side thereof, while car ladles may be formed with either one, three or five trunnions on each side thereof depending upon the particular construction and operation thereof, the different types being well understood in the art. In the group of figures last referred to there is illustrated a structure including a lifting trunnion 65 and a pair of mounting trunnions 66 for each side of the ladle.

In carrying out the invention disclosed in these figures, the ladle shell 67 may have formed therein an opening 68, similar to the opening 39 of Figure 24 and around which is secured a pad or seat 69 similar in construction and function to the seat 40 of Figure 24. The trunnion 65 has a reduced inner portion 71 adapted to extend through the opening in the pad 69 and the alined opening 68 in the ladle shell with the trunnion shoulder 72 abutting against the outer surface of the pad 69. Cooperating with the pad 69 is an outer trunnion plate 73 formed with a trunnion received opening 74 and shaped to cooperate with a flange 75 on the trunnion. With the parts assembled in the manner illustrated in the drawings, it will be apparent that they may be welded in position in any desired manner, the pad and shell forming one seat and the outer trunnion plate 73 forming a second seat axially spaced therefrom, thus again affording an elongated bearing. For transmitting the trunnion load directly to the shell, and for stiffening the trunnion plate 73, there may be provided a filler or cover plate 76 extending between the upper edge of the same and the ladle shell as indicated more particularly in Figures 16 and 17. The trunnion plate 73, which is conveniently formed by a suitable pressing operation, is shaped to provide in addition to a seat 77 for the lifting trunnion 65, a pair of similar seats 78 for the supporting trunnions 66. These trunnions may be of any desired construction, but are herein illustrated as having a reduced inner end 79 adapted to extend through suitable openings in the seats 78 and directly into suitable openings in the ladle shell. The ladle shell adjacent such openings is reinforced to provide an extended seat, by seat forming and stiffening plates 80.

As before pointed out, it will be apparent that the lifting trunnions 65 instead of being of the simple construction illustrated, for example, in Figures 9 to 11, may be of the construction illustrated more particularly in Figures 20 to 24 inclusive.

In Figure 7 of the drawings there is illustrated in section a slightly modified form of the invention from that shown in Figure 6. In Figure 6 the ends of the plates forming the intermediate section are illustrated as being cut away in such manner as to extend in overlapping relationship. In Figure 7 the meeting edges of the plates 81 and 82 are shown as extending in abutting relationship and as being beveled to provide V shaped recesses 83 and 84 on opposite sides of the shell, which recesses are adapted to be filled with a welding material 85.

In Figure 5 there is shown in side elevational view a form of interlocking joint by reason of which the interlocking of the ends may be more effectively accomplished. In accordance with this figure, the plates 81 and 82 are shown as having alternate projections 86 and depressions 87 and adapted to cooperate with similarly shaped parts on the adjacent end of the cooperating plate. The assembling and interlocking having been accomplished, the parts may be welded together in the manner shown in Figures 6 and 7. Various other forms of connecting the end portions of the shell forming plates will readily suggest themselves.

All of the forms of the invention are characterized by the provision of trunnions having either continuous elongated bearings, or elongated bearings formed by seats spaced axially in a direction along the trunnion axes. They are likewise characterized by the use of trunnions adapted to extend into and through the ladle shell itself whereby to form in effect a continuation of the ladle shell surface and thus provide a continuous surface to which refractory material may be applied for purposes of lining the shell.

With all of the forms described, with the exception of that shown more particularly in Figure 21, there are utilized outer trunnion plates serving not only the function of providing the desired trunnion seats, but the further purpose of distributing the trunnion load through a substantial portion of the ladle shell area thereby preventing excessive localized deforming stresses.

While we have described the forms of Figures 9 to 12 as being utilized with a trunnion spacer bar, it will be understood that where the ladle shell is of the construction for example illustrated in Figure 1 of the drawings, such spacer bar may be entirely eliminated. In any case both the shell and spacer bar may be formed of pressed up plate-like material having a maximum and uniform strength and materially lighter than the castings heretofore utilized.

It is further understood that each form of trunnion mounting herein described is applicable either to a ladle having only a pair of trunnions or to ladles having a plurality of pairs of trunnions.

Where new ladles are being constructed, the shell will preferably be of the general type illustrated in Figures 1 to 8 with a thickened self-sustaining intermediate body section to which top and bottom sections are secured, whereby replacement at will of any of the sections may be made.

Further advantages arise from the provision of a ladle construction in which the trunnions are adapted to be secured in position not only through the medium of mechanically abutting or interlocking surfaces, but also through the medium of welding.

While we have herein illustrated and described certain preferred embodiments of the present invention, it will be understood that changes in the construction, arrangement and operation of the parts may be made without departing either from the spirit of the invention or the scope of our broadest claim.

We claim:

In a ladle shell, a bottom portion composed of metallic plate so dimensioned in cross section as to have strength only to safely withstand the vertical load imposed by the weight of the ladle contents and the lateral pressure created thereby, an intermediate portion composed of a metallic annulus attached to the bottom portion, said annulus having trunnions secured thereto, and constituting a ring beam, having a section thicker than that of the bottom portion and a strength to safely sustain the combined torsional, bending and shearing load imposed thereon when the ladle is suspended on said trunnions, without material deformation, and a top portion of substantially the thickness of the bottom portion, attached to said annulus.

PORTER POLLOCK.
CHRISTIAN A. WILLS.